(12) United States Patent
Zamorano Senderos et al.

(10) Patent No.: US 12,397,493 B2
(45) Date of Patent: Aug. 26, 2025

(54) APPARATUSES, METHODS, AND PRODUCTS FOR COLD SPRAY ADDITIVE MANUFACTURING OF MULTI CURVED AND REINFORCED COMPONENTS

(71) Applicant: The Boeing Company, Chicago, IL (US)

(72) Inventors: Bruno Zamorano Senderos, Huntsville, AL (US); Dennis Lynn Coad, Madison, AL (US); Kenneth W. Young, Seattle, WA (US)

(73) Assignee: The Boeing Company, Arlington, VA (US)

( * ) Notice: Subject to any disclaimer, the term of this patent is extended or adjusted under 35 U.S.C. 154(b) by 208 days.

(21) Appl. No.: 16/827,341

(22) Filed: Mar. 23, 2020

(65) Prior Publication Data

US 2021/0291431 A1    Sep. 23, 2021

(51) Int. Cl.
  *B29C 64/106* (2017.01)
  *B29C 33/20* (2006.01)
  (Continued)

(52) U.S. Cl.
  CPC ............ *B29C 64/106* (2017.08); *B29C 33/20* (2013.01); *B29C 33/42* (2013.01); *B33Y 10/00* (2014.12); *B33Y 80/00* (2014.12)

(58) Field of Classification Search
  CPC ....... B29C 33/42; B29C 64/106; C23C 4/134; C23C 24/04
  (Continued)

(56) References Cited

U.S. PATENT DOCUMENTS 5,753,170 A * 5/1998 Muang ................... B22D 19/00
                                                                    164/112
7,670,133 B2 * 3/2010 Binda ..................... B29C 66/54
                                                                    425/503
(Continued)

FOREIGN PATENT DOCUMENTS

| EP | 3231602 A1 | 10/2017 |
| EP | 3339474 A1 | 6/2018 |
| JP | 2019537523 A | 12/2019 |

OTHER PUBLICATIONS

"Extended European Search Report Issued in European Patent Application No. 21151848.5", Mailed Date: Jun. 29, 2021, 13 Pages.
(Continued)

*Primary Examiner* — Michael A Tolin
*Assistant Examiner* — Hana C Page
(74) *Attorney, Agent, or Firm* — Walters & Wasylyna LLC

(57) ABSTRACT

Implementations provide cold spray additive manufacturing ("CSAM")-based fabrication of a complex multi curvature part ("CMCP") by cold spraying onto a mold. Implementations achieve the desired shape and dimensions of a CMCP having variable surface thicknesses and utilize reinforcements integrated during CSAM. Reinforcements are integral to each CMCP as soon as fabrication is complete, and maintain stiffness, avoid fluttering, and provide other similar benefits. Implementations provide a stiff CMCP with multiple curvatures having fully controllable variable thicknesses. Integral reinforcements added during fabrication avoid tolerance issues by avoiding coupling non-reinforced CMCPs to reinforcements or other post-fabrication adjustments. CSAM-based CMCPs, having directly integrated reinforcements, exhibit superior tolerances that do not need to be re-worked or otherwise corrected after fabrication.

(Continued)

Reinforcement attachment methods that have complex load transfer behavior are not necessary. In some implementations, simplifying load transfer increases the maximum load and decreases the overall weight of the finished CMCP.

22 Claims, 12 Drawing Sheets

(51) Int. Cl.
    *B29C 33/42*     (2006.01)
    *B33Y 10/00*     (2015.01)
    *B33Y 80/00*     (2015.01)

(58) Field of Classification Search
    USPC .......................................................... 264/33
    See application file for complete search history.

(56) References Cited

U.S. PATENT DOCUMENTS

| | | | |
|---|---|---|---|
| 9,254,619 B2 * | 2/2016 | Rotter | B29C 70/462 |
| 10,105,940 B2 * | 10/2018 | Chapman | B32B 37/14 |
| 10,335,850 B2 * | 7/2019 | Roberge | C23C 14/221 |
| 2006/0237588 A1 * | 10/2006 | Kismarton | B64C 1/065 |
| | | | 52/840 |
| 2009/0297358 A1 * | 12/2009 | Anderson | B29C 70/34 |
| | | | 416/241 A |
| 2011/0308714 A1 * | 12/2011 | Sander | B29C 70/54 |
| | | | 156/243 |
| 2012/0076989 A1 * | 3/2012 | Bland | B64C 1/064 |
| | | | 264/219 |
| 2014/0115854 A1 | 5/2014 | Widener et al. | |
| 2015/0056465 A1 | 2/2015 | Zahiri et al. | |
| 2016/0121553 A1 * | 5/2016 | Paesano | B29C 70/541 |
| | | | 264/258 |
| 2017/0106970 A1 * | 4/2017 | Stawski | B64C 9/00 |
| 2017/0291214 A1 | 10/2017 | Roberge | |
| 2017/0292194 A1 * | 10/2017 | Roberge | C25D 3/56 |
| 2018/0178331 A1 | 6/2018 | Roberge et al. | |
| 2018/0179639 A1 | 6/2018 | Roberge et al. | |
| 2018/0179640 A1 | 6/2018 | Roberge et al. | |
| 2019/0316262 A1 | 10/2019 | Camilleri et al. | |

OTHER PUBLICATIONS

European Office Action dated Jan. 24, 2023, for Application No. 21 151 848.5-1103.

Chinese Office Action for Application No. 202110286902.6, dated Jan. 25, 2024, 4 pages.

First Office Action in Chinese Application No. 202110286902.6, dated Jul. 21, 2023, 13 pages.

Japan Patent Office, Office Action, App. No. 2021-006463 (Feb. 18, 2025).

European Communication for Application No. 21151848.5, dated Jul. 11, 2023, 6 pages.

* cited by examiner

APPARATUSES, METHODS, AND PRODUCTS FOR COLD SPRAY ADDITIVE MANUFACTURING OF MULTI CURVED AND REINFORCED COMPONENTS

BACKGROUND

In various fields of manufacturing, fabrication of complex (e.g., multi curved and reinforced) components (each also called a "complex multi curvature part" or "CMCP" herein) is a complicated and time-consuming process. Such parts include at least two surfaces having different radii of curvature, as well as components reinforcing the surfaces. Traditional fabrication involves several distinct steps, and often requires parts and equipment that must be obtained from multiple suppliers. Such logistical challenges increase costs, manufacturing time, and risk of problems that either alone or in combination render such manufacturing cost-prohibitive in certain contexts. Generally, traditional manufacturing of CMCPs begins by deforming a thin layer of material to reduce thickness in certain areas of the fabricated CMCP while also achieving the desired shape and dimensions. However, in traditional fabrication, controlling the thickness and shape of the fabricated CMCP, especially where variable surface thicknesses are desired, is difficult and possibly impracticable in certain implementations. Reinforcements (also called "stiffeners" herein) are added after this deformation and shaping stage to maintain stiffness, avoid fluttering, etc.

In many aerospace applications utilizing CMCPs, each CMCP is attached to at least one stiffener that has a double purpose of (1) maintaining the shape of the CMCP surface under load(s); and (2) transmitting the load(s) applied to the surfaces of the CMCP to the underlying supporting structure of the CMCP. Such traditional stiffeners are often rivets. The use of rivet stiffeners or the equivalent increases the expense and complexity of manufacturing a part; and also extends fabrication times.

Traditional manufacturing of CMCPs requires the integration of several parts and processes. Typically, the surface is formed by superplastic forming, hydroforming, incremental forming, or a similar technique. Superplastic forming diffusion bonding, in particular, is a very complex and expensive approach able to create a stiff part with multiple curvatures, but that cannot provide full control over the thickness of the surfaces of the fabricated CMCP, and also requires reinforcement stiffeners to be added in a subsequent step, increasing processing time and potentially increasing the likelihood of poor manufacturing tolerance issues due to the increased likelihood of part mismatches. In traditional manufacturing, the stiffeners are formed in an independent step from, e.g., the CSAM process. Further, in traditional manufacturing, poor tolerances between parts produce fabrication mismatches requiring shims or other post-manufacturing adjustments to accommodate the poor tolerances.

Traditional manufacturing of CMCPs thus: is expensive and time consuming; requires multiple parts and labor-intensive complex fabrication steps; often produces unavoidably poor tolerances requiring re-working or other correction (e.g., shims) after fabrication is complete; requires riveting or other attachment methods that have complex load transfer behavior, reducing the maximum load of the finished part and increasing overall weight of the finished part; and is incapable of delivering a finished part with surfaces having intentionally variable thicknesses.

SUMMARY

Some implementations provide a mold for cold spray additive manufacturing ("CSAM"). The mold comprises a first portion and a second portion. The first portion and the second portion are configured to abuttingly engage each other with a gap formed longitudinally therebetween. An outer surface of the first portion engaged with the second portion is a complex shape. The mold further comprises a reinforcement member positioned in the gap. The first portion, the second portion, and the reinforcement member are configured to be cold sprayed to form a unified part. The reinforcement member is integral with the unified part.

Other implementations provide a method for performing CSAM. The method comprises: configuring a mold to have a first portion and a second portion. A gap is formed longitudinally between the first portion and the second portion. An outer surface of the first portion engages with the second portion to form a complex shape. The method further comprises positioning a reinforcement member in the gap; first cold spraying (i) one of the first portion or the second portion and (ii) the reinforcement member; and second cold spraying the second portion to form a unified part. The reinforcement member is integral with the unified part.

Still other implementations provide a unified part prepared by a CSAM process. The CSAM process comprises the steps of configuring a mold to have a first portion and a second portion. A gap is formed longitudinally between the first portion and the second portion. An outer surface of the first portion engages with the second portion to form a complex shape. The method further comprises positioning a reinforcement member in the gap; first cold spraying (i) one of the first portion or the second portion and (ii) the reinforcement member; and second cold spraying the second portion to form a unified part. The reinforcement member is integral with the unified part.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the present disclosure will become better understood when the following detailed description is read with reference to the accompanying drawings, wherein.

Corresponding reference characters indicate corresponding parts throughout the drawings in accordance with an implementation.

DETAILED DESCRIPTION

Figure 1A:
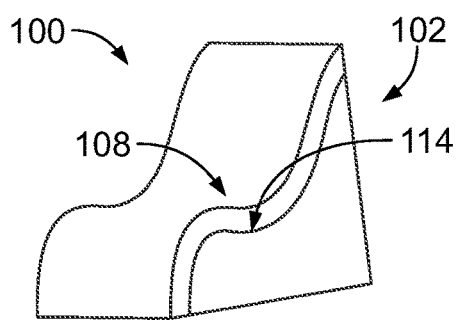
FIG. 1A-1G are perspective views of a mold for cold spray additive manufacturing in use to create a unified part in accordance with an implementation.

Cold spray additive manufacturing (also "cold spray" or "CSAM" herein) is a material-deposition process where metal or metal-ceramic mixtures of powders (also referred to as "particles" herein) suspended in a gas propelled at supersonic speed are used to form a coating or freestanding structure. Specifically, cold spraying is defined herein as spraying a material at a temperature that is below the melting point of the material being sprayed. CSAM is a solid state process: neither the powders nor the substrate to which the powders are applied are melted during the process. Thus, use of CSAM provides material-deposition that does not cause thermally induced alterations to the substrate or powder (e.g., deformation, crystallization, imperfections, or other types of damage). Due to the direct impingement of the gases carrying the powders upon the substrate, cold spray generates a stationary shock wave and also a lateral flow of gas along the surface of the part subject to CSAM.

High- and low-pressure cold spray is an emerging technology finding increasing applications in various types of structural repairs and parts manufacture. In some implementations, high- or low-pressure cold spray is usable to build metallic structures (e.g., airplane or helicopter components). A closer examination of an implementation of a CSAM apparatus and process is provided in the discussion of FIG. 8 herein.

Referring to the figures, implementations of the disclosure include apparatuses, methods, and products for CSAM-based fabrication of complex (e.g., multi curved and reinforced) components (each also called a "complex multi curvature part" or "CMCP" herein). The disclosure provides apparatuses, methods, and products for streamlining, speeding up, and reducing the costs of cold spray additive manufacturing of CMCPs. The disclosure requires less distinct steps and does not necessitate obtaining parts and equipment from multiple suppliers. Obviating these logistical challenges decreases costs, lowers manufacturing time, and lessens the risk of problems that otherwise, in certain contexts, either alone or in combination render CMCP manufacturing via CSAM cost-prohibitive.

CSAM-based CMCP fabrication is accomplished via the use of cold spray-based techniques in combination with a mold as disclosed herein. Because cold spray allows each CMCP to be built to precise specifications directly on the mold, there is no need to attempt to deform a pre-existing thin layer of material to reduce thickness in certain areas of the fabricated CMCP while also achieving the desired shape. Thus, the disclosure completely avoids the difficulties associated with the traditional, contemporary processes concerning controlling thickness of various surfaces while achieving the desired shape and dimensions of the completed CMCP, including CMCPs having variable surface thicknesses.

The elements described herein in various implementations operate in an unconventional manner to provide apparatuses, methods, and products for CSAM-based CMCP fabrication by utilizing reinforcements integral to the completed CMCPs. Implementations of the disclosure incorporate the addition of reinforcements during the CSAM process, such that the reinforcements are properly placed and integral to each CMCP as soon as the CSAM-based fabrication is complete. These reinforcements maintain stiffness, avoid fluttering (an unstable oscillation that can lead to destruction of a structure), and provide other similar benefits to fabricated CMCPs. CSAM is thus ideal to fabricate integrally reinforced CMCPs having complex geometric structures with surfaces having complex curvatures.

The disclosure allows the creation of a stiff CMCP with multiple curvatures wherein the creator has full control over the thicknesses of the surface of the CMCP. Because integral reinforcements are added during the creation of the CMCP, there is no need to add reinforcements later. Compared to traditional CMCP fabrication, this decreases processing time and avoids introducing poor tolerance issues, as the integral construction obviates the need to match non-reinforced CMCPs together with reinforcements at a later stage. Avoiding such fabrication mismatches, and thus avoiding the associated poor tolerances, further obviates the need for shims or other post-manufacturing adjustments.

The implementations of the present disclosure are thus superior to typical implementations of CMCP fabrication that do not allow for the utilization of reinforcements integral to the completed CMCPs, but rather depend on adding non-integral reinforcements in a later stage of the manufacturing process. The performance of implementations of the apparatuses, methods, and products for CSAM-based CMCP fabrication disclosed herein, particularly as measured by the benefits and advantages of integral reinforcement introduced during CMCP fabrication as discussed above, substantially equals and sometimes exceeds conventional existing contemporary apparatuses, methods, and products for CSAM-based CMCP fabrication. The disclosure decreases expenses and manufacturing time; needs fewer parts relative to traditional techniques; and has fewer and has less labor-intensive complex fabrication steps. The disclosed CSAM-based CMCPs, having reinforcements integrated directly therein during CSAM-based fabrication, exhibit superior tolerances that do not need to be re-worked or otherwise corrected after manufacturing is complete. Riveting or other attachment methods that have complex load transfer behavior are not necessary. In some implementations, simplifying load transfer by simplifying the load path (e.g., the direction in which each consecutive load on a load-bearing structure will pass through each connected member of a load bearing structure) increases the maximum load of the finished CMCP and decreases the overall weight of the finished CMCP.

The disclosure is readily capable of delivering a finished CMCP with multiple surfaces having intentionally variable thicknesses, whose thicknesses are precisely controllable by the creator of the CMCP. The cold spray process enables functionally grading CMCPs having variable surface thicknesses and created as disclosed herein, even when the reinforcements and the rest of the CMCP comprise dissimilar but compatible materials. The disclosure is thus mechanically more robust and more cost effective to implement, while at the same time being more effective than conventional apparatuses, methods, and products for fabrication of CMCPs.

Referring again to FIGS. 1A-1G, FIGS. 1A-1G are perspective views of a mold 100 for cold spray additive manufacturing in use to create a unified part 150 in accordance with an implementation. The mold 100 comprises a first portion 102 and a second portion 104. The first portion 102 and the second portion 104 are configured to abuttingly engage each other. A gap 106 is formed longitudinally therebetween. In some implementations, the gap 106 is formed by a cutout 114 in one of the first portion 102 or the second portion 104. In some such implementations, the cutout 114 extends only along a subsection 116 of one side 118 of the first portion 102 or the second portion 104. Each such cutout 114 forms a ridge 120 extending longitudinally along the subsection 116.

An outer surface 108 of the first portion 102 engages with the second portion 104. The outer surface 108 of the first portion 102 engaged with the second portion 104 is a complex shape 110. In some implementations, the complex shape 110 comprises multiple different curvatures 122. For example, the complex shape 110 can include multiple curved surfaces, having the same or different radius of curvature, and which can be curved in the same or different directions.

The mold 100 further comprises a reinforcement member 112 positioned in the gap 106. In some implementations, the reinforcement member 112 is a planar stiffener (e.g., a stiffening member having a planar surface extending within a plane). However, it should be appreciated that in some implementation, the stiffener is curved.

The first portion 102, the second portion 104, and the reinforcement member 112 are configured to be cold sprayed to form a unified part 150. The unified part 150 includes the reinforcement member 112 as being integral therewith. By the end of cold spray operations, the unified part 150 is at least a near net shape (e.g., very close to the target shape, lessening the need for final machining). In such implementations, final machining operations are performed to bring the unified part 150 to the desired exact shape according to the intended specifications and tolerances of the unified part 150. In some implementations, a segment 124 of the reinforcement member 112 extends from an outer surface 154 of the unified part 150. After cold spraying is complete, the segment 124 is machined to be planar with the outer surface 154 of the unified part 150. Such implementations enable the routine use of any reinforcement member 112 having a standardized shape and size in combination with any mold 100 having any combination of shape and size, without first having to modify the reinforcement member 112 to fit the exact shape and size of the mold 112 before cold spraying. Because the excess non-planar portion of the segment 124 is removed after cold spraying is complete, CSAM as disclosed herein is rendered mechanically simpler, faster, cheaper, and less error prone. The first and second portions 102 and 104 of the mold 100 can be curved along a contact region with (in contact with) the reinforcement member 112, thereby enabling the reinforcement member 112 to have out of plane curvature.

Some implementations of the mold 100 further comprise a support device 126 configured to support the reinforcement member 112 in the gap 106. In some such implementations, the support device 126 comprises at least one of a fastener, vacuum suction, or magnetic coupling. Other implementations of the mold 100 further comprise a support member 128 positioned to support the reinforcement member 112 in the gap 106.

In some implementations, the unified part 150 formed by the cold spraying further comprises an at least one surface 152 having variable thickness. In some implementations, variable thickness means that the at least one surface 152 is divisible into subunits each defined by having a specific thickness. In yet other implementations, variable thickness means that each of the at least one surfaces 152 has a uniform thickness defined independently of the thickness of any other of the at least one surfaces 152. In still other implementations, variable thickness means the at least one surface 152 exhibits a combination of the foregoing definitions of variable thickness.

In some implementations, the mold 100 is usable in combination with a CSAM process to form a complex unified part 150 (the CSAM process using the mold 100 being the "mold process"). As illustrated in FIG. 1A, the first portion 102 of the mold 100 is a complex mold of a three-dimensional shape. Depending on the intended application, the mold 100 is manufacturable from a variety of materials compatible with CSAM. In some implementations, the material sprayed onto the mold 100 to fabricate the unified part 150 is the same type of material as the mold 100. CSAM-compatible materials suitable to construct the mold 100 include but are not limited to: aluminum, Inconel, steel, zinc, brass, Monel, stainless steel, zirconium, bronze, nickel, tantalum, copper, niobium, tin, CSAM-compatible refractor metals, chrome carbide nickel chromium (CrC—NiCr), silver, and titanium.

Before use, both the first portion 102 and the second portion 104 of the mold 100 must be prepared so that any material cold sprayed onto the mold 100 is non-destructively separable from the mold 100. In some implementations, a surface treatment is applied to the first portion 102 and the second portion 104 of the mold 100 to facilitate non-destructive separation. In some such implementations, the surface treatment comprises coating the first portion 102 and the second portion 104 with a surface treatment (e.g., a liquid film). In some implementations, the liquid film is a lanolin-based fluid film that leaves a wet, non-drying, corrosion-resistant layer on the surface to which the liquid film is applied. The surface treatment is removable from the mold 100 after use (e.g., for cleaning or maintenance of the mold 100). Different types of surface treatment are applicable to the same mold 100. The type of surface treatment chosen depends on the needs of a particular application.

At least one of the first portion 102 or the second portion 104 of the mold 100 has an indentation (e.g., the cutout 114) therein. The indentation is configured to support a stiffener (e.g., the reinforcement member 112) proximate thereto. The stiffener is made from either the same material as the mold 100 or a material known to be mechanically-compatible with the material of the mold 100.

Figure 1B:
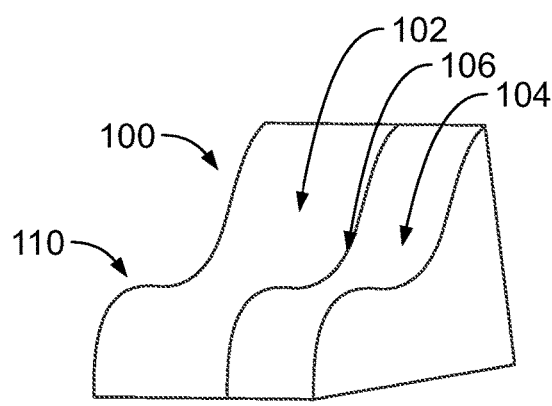

As illustrated in FIG. 1B, the second portion 104 of the mold is shaped such that at least one side of the second portion 104 has the same shape and dimensions as the side of the first portion 102 having the indentation. FIG. 1B shows the first portion 102 abuttingly engaged with the second portion 104 to comprise the entire complex shape of the mold 100. In some implementations, both the first portion 102 and the second portion 104 have mirroring, identical indentations. Such implementations allow use of a stiffener having increased thickness, and thus increased strength. When the first portion 102 is abuttingly engaged with the second portion 104 while the stiffener is supported proximate to either the first portion 102 or the second portion 104, the mold 100 securely entraps the stiffener, holding the stiffener in place relative to the first portion 102 and the second portion 104.

Figure 1C:
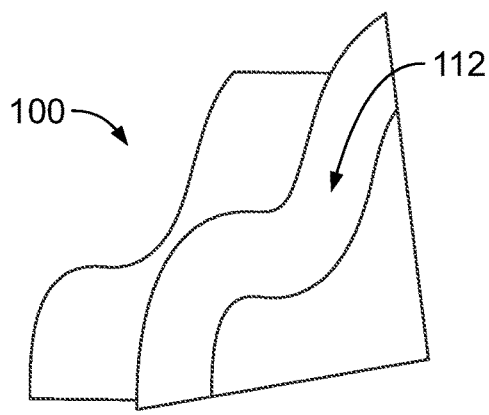

As illustrated in FIG. 1C, the stiffener is cut to fit the contours of the indentation of at least one of the first portion 102 or the second portion 104 of the mold 100 to optimize the support given by the indentation to the stiffener. In some implementations, the cut stiffener acts as an inner plate between the first portion 102 and the second portion 104. The stiffener is trimmed to match the curvature of either the first portion 102 or the second portion 104 of the mold 100. In some implementations, the trimmed stiffener protrudes at least in part from either the first portion 102 or the second portion 104 the mold 100.

Figure 1D:
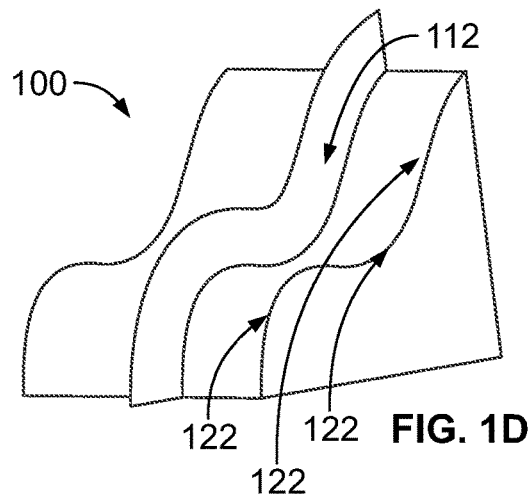

As illustrated in FIG. 1D, after the stiffener is cut to fit the contours of the indentation of either the first portion 102 or the second portion 104 of the mold 100 to optimize the support given by the indentation to the stiffener the first component 102 and the second component 104 abuttingly engage each other such that the mold 100 is proximate to either side of the stiffener, holding the stiffener in place relative to the first portion 102 and the second portion 104. With the stiffener thus installed, the mold 100 is now ready for use in CSAM fabrication operations.

Figure 1E:
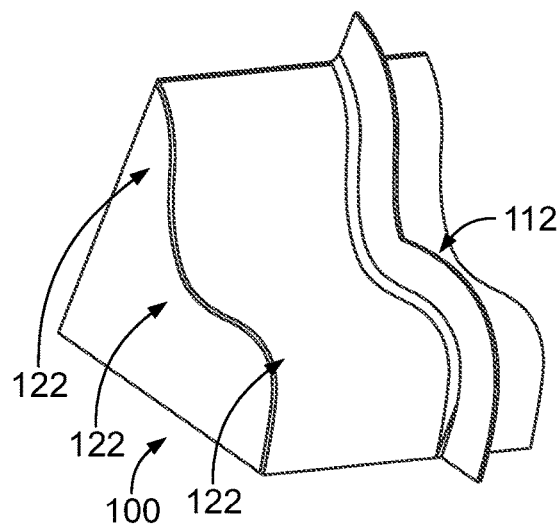

As illustrated by FIG. 1E, the initial CSAM coating comprises first cold spraying (i) one of the first portion 102 or the second portion 104 and (ii) the stiffener. In some implementations, a robotic arm (e.g., as described in the discussion of FIG. 8 below) is used to conduct CSAM operations. Whether the first portion 102 or the second portion 104 is cold sprayed first depends on the particular application, and otherwise has no bearing on the overall result unless otherwise noted herein. During CSAM operations, material is cold sprayed in variable thicknesses onto (i) one of the first portion 102 or the second portion 104 and (ii) the stiffener as is required by the particular application. After such CSAM operations are complete, both (i) one of the first portion 102 or the second portion 104 and (ii) the stiffener are integral with each other, forming a partially unified part.

Figure 1F:
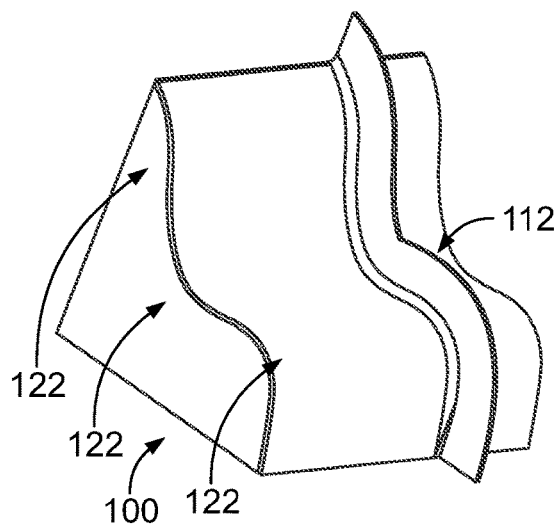

As illustrated in FIG. 1F, the second CSAM coating comprises second cold spraying material in various thicknesses onto the partially unified part and whichever of the first portion 102 or the second portion 104 was not cold sprayed previously. The first portion 102, the second portion 104, and the stiffener, proximate to one another as described above, have now each been subject to coating by CSAM, thus forming the unified part 150 proximate to the mold 100. The stiffener is now integral with the entire unified part 150 such that the stiffener cannot be non-destructively removed from the unified part 150. In some implementations, surfaces of the unified part 150 have variable thicknesses and defined herein.

In some implementations, cold spraying the first portion 102 of the mold 100 and then cold spraying the second portion 104 of the mold 100 using the technique described above makes it easier to ensure good bonding between each of the mold 100, the stiffener, and the particular cold spray feed stock currently in use. This ensures a sufficient (e.g., permanent or semi-permanent barring deliberate disassembly or accidental destruction) seam or seal between the stiffener the unified part 150 now incorporating the stiffener.

In some implementations continuous CSAM is used across both the first portion 102 and the second portion 104 of the mold 100. This is in contrast to first cold spraying the first portion 102 and then cold spraying the second portion 104, or vice versa. In some implementations utilizing continuous CSAM and depending on the application (e.g., the shape of the mold 100), the direction in which the robot conducting CSAM moves while depositing the cold spray material determines the construction quality of the unified part 150. In such implementations, a user or semi-automated or automated CSAM apparatus must choose the direction that will yield the optimal results. In some such implementations, a left-to-right movement across the mold 100 yields optimal results.

Figure 1G:
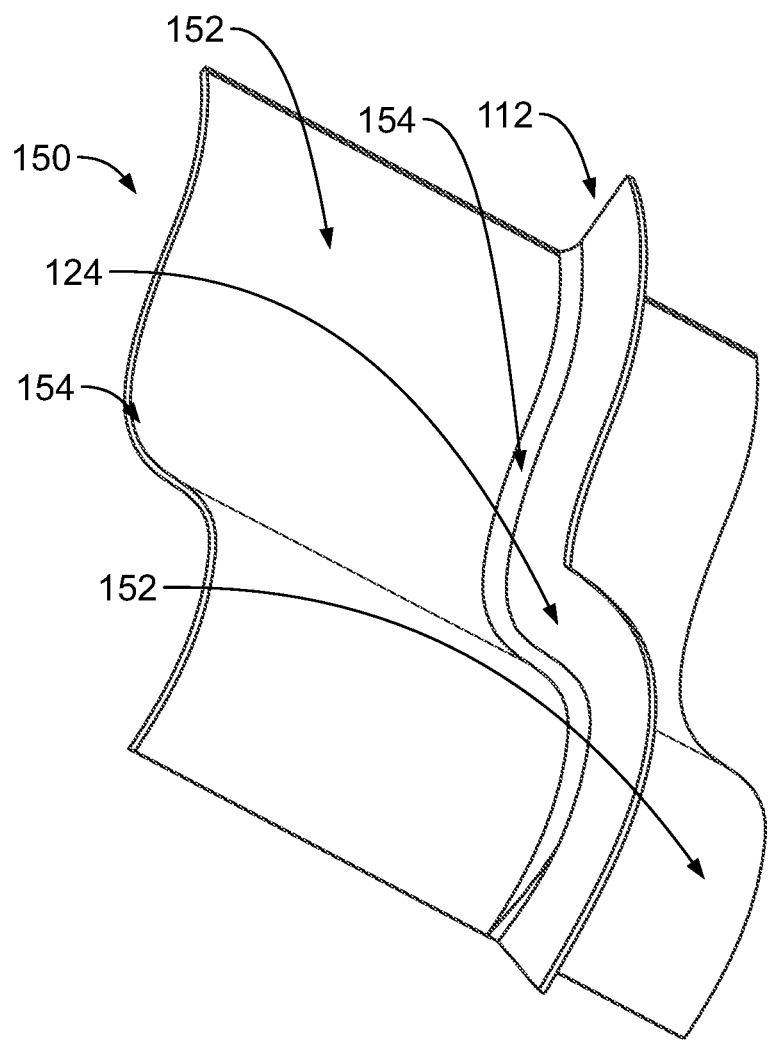

FIG. 1G illustrates the unified part 150 upon completion of all CSAM operations. As shown in FIG. 1G, the unified part 150 has been removed from the mold 100 (e.g., lifted away by either a user or a robotic arm). As noted above, the unified part 150 now incorporates the stiffener such that the stiffener cannot be non-destructively removed from the unified part 150. After removal from the mold 100, any remnants of the surface treatment used to prevent the mold 100 from sticking to the unified part 150 are removable from the unified part 150.

In some implementations, a segment 124 of the stiffener extends from an outer surface 154 of the unified part 150. To complete fabrication of the unified part 150, the segment 124 is machined to be planar with the outer surface 154 of the unified part 150. In some implementations, once the machining is complete and the segment 124 is planar with the outer surface 154, the segment is visually indistinguishable from the rest of the unified part 150. In some implementations, the amount of the segment 124 subject to machining is limited by the necessity of ensuring that the machining does not lessen the effectiveness of the stiffener.

In some alternate implementations of the mold process described above, neither the mold 100 as a whole nor the constituent first portion 102 or the second portion 104 incorporate any curvature. In such implementations, once the non-curved unified part 150 is formed as described above, curvature is added as part of a finalizing set of operations including but not limited to machining and other tooling.

In some other alternate implementations of the mold process, an alternative mechanism is substituted for the stiffener. Such alternative mechanisms include but are not limited to at least one of brackets, shelves, clamps, or other mechanically similar items.

Figure 2:
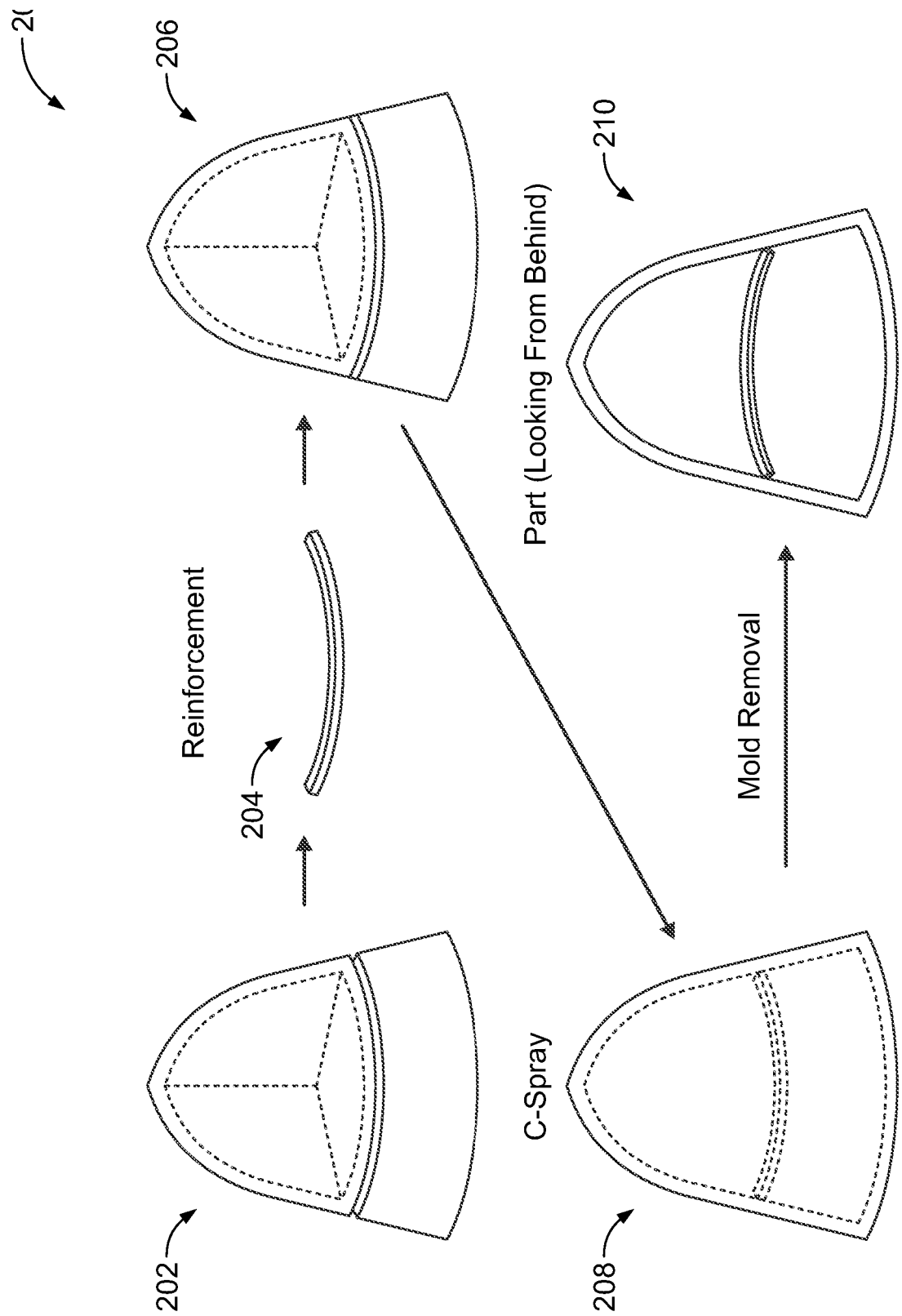
FIG. 2 is a flow diagram illustrating the use of a male metallic mold for cold spray additive manufacturing in use to create a unified part in accordance with an implementation.

FIG. 2 is a flow diagram 200 illustrating the use of a male metallic mold for cold spray additive manufacturing in use to create a unified part in accordance with an implementation. In some implementations, the male metallic mold is the mold 100 of FIGS. 1A-1F. In some implementations, the unified part is the unified part 150 of FIG. 1G. The mold is separated into a first portion (e.g., the first portion 102 of FIGS. 1A-1F) and a second portion (e.g., the second portion 104 of FIGS. 1A-1F) at operation 202. A stiffener (e.g., the reinforcement member 112 of FIG. 1A-1F) is prepared at operation 204. At operation 206, the first portion and the second portion are configured to abuttingly engage each other with a gap (e.g., the gap 106 of FIGS. 1A-1F) formed longitudinally therebetween. An outer surface (e.g., the outer surface 108 of FIGS. 1A-1F) of the first portion engages with the second portion to form a complex shape (e.g., the complex shape 110 of FIGS. 1A-1G). The stiffener is positioned in the gap. At the completion of operation 206, the mold is given a surface treatment as described elsewhere herein and is ready for CSAM operations. Cold spray operations creating the unified part as described elsewhere herein are performed at operation 208. The unified part is removed from the mold as described elsewhere herein at operation 210. Depending on the configuration of the mold, in some implementations a segment (e.g., the segment 124 of FIG. 1A-1G of the stiffener extends from an outer surface (e.g., the outer surface 154 of FIG. 1G) of the unified part. In some such implementations, the segment is machined to be planar with the outer surface of the unified part as described elsewhere herein. This operation is not shown in FIG. 2.

In the particular implementation illustrated in FIG. 2, CSAM operations are conducted over the front of the mold, and the extending segment of the stiffener extends from the back of the unified part. In this implementation, the mold is removed from the back of the unified part, and the extending segment of the of the stiffener extends from an outer surface on the back of the unified part prior to machining.

Figure 3:
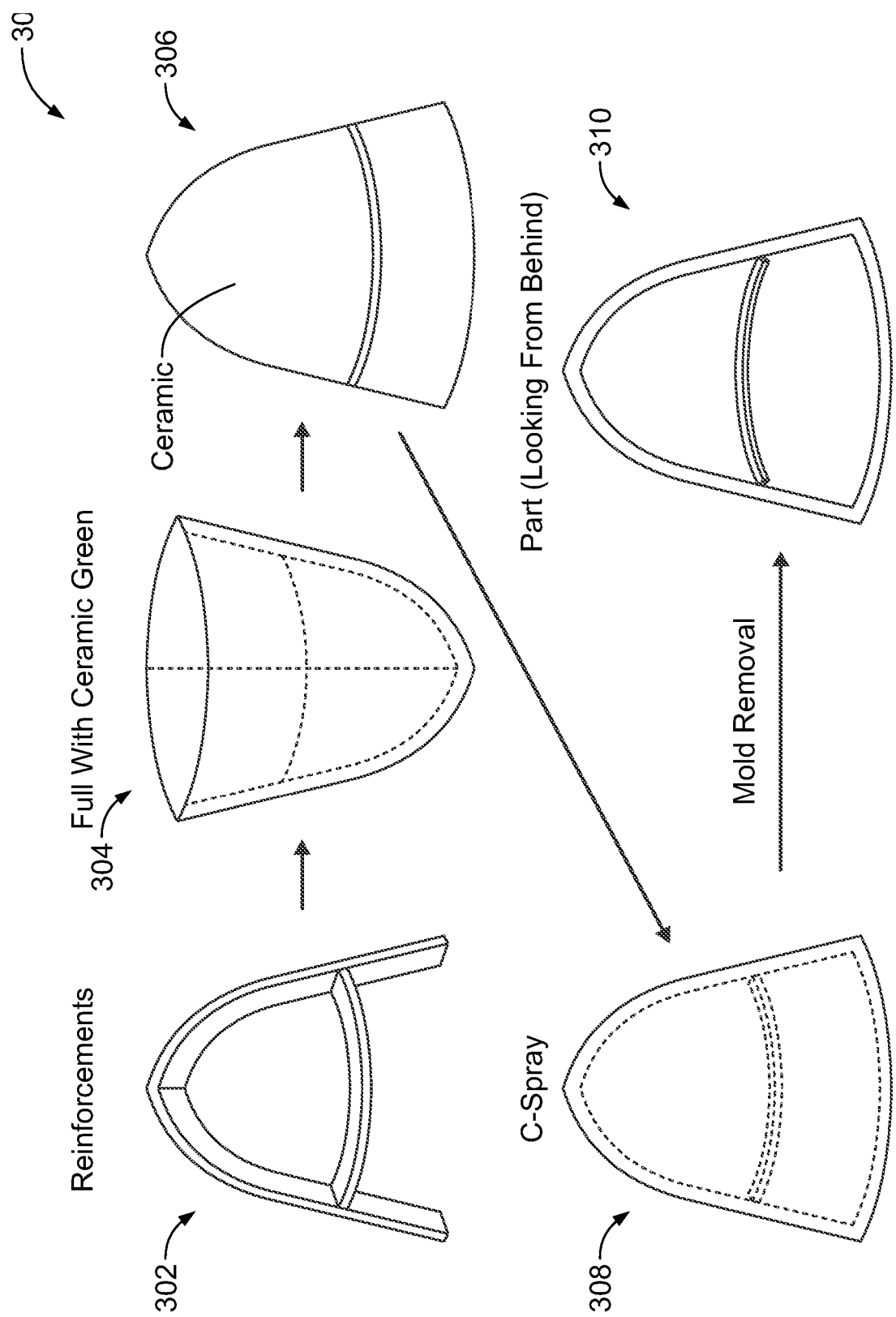
FIG. 3 is a flow diagram illustrating the use of a male disintegrable mold for cold spray additive manufacturing in use to create a unified part in accordance with an implementation.

FIG. 3 is a flow diagram 300 illustrating the use of a male disintegrable mold for cold spray additive manufacturing in use to create a unified part in accordance with an implementation. In some implementations, the male disintegrable mold is the mold 100 of FIGS. 1A-1F. In some implementations, the unified part is the unified part 150 of FIG. 1G. Before use, the mold is given a surface treatment as described elsewhere herein and is ready for CSAM operations. A stiffener (e.g., the reinforcement member 112 of FIG. 1A-1F) is prepared at operation 302. The mold is filled with ceramic green or an equivalent material at operation 304. Ceramic green is a weakly bound clay material traditionally used in the form of bonded powder or plates that have not been sintered or fired. The stiffener is inserted into the mold at operation 306. In some implementations, operation 306 occurs before operation 304. An outer surface (e.g., the outer surface 108 of FIGS. 1A-1G) of the mold containing the stiffener and the ceramic green forms a complex shape (e.g., the complex shape 110 of FIGS. 1A-1G). The outer surface of the mold is subjected to CSAM operations creating the unified part as described elsewhere herein at operation 306. At the conclusion of operation 306, the mold is inside the unified part.

The mold is attacked and dissolved or destroyed at operation 310, such that only the unified part with the integrated stiffener remains. This destruction or dissolution is accomplished through at least one of heat treatment, shaking, application of controlled vibrations, or any other method suitable to destroy the mold without damaging or impacting the structural integrity of the unified part or the stiffener or ceramic green (or equivalent) therein. Depending on the configuration of the mold, in some implementations a segment (e.g., the segment 124 of FIG. 1A-1G) of the stiffener extends from an outer surface (e.g., the outer surface 154 of FIG. 1G) of the unified part. In some such implementations, the segment is machined to be planar with the outer surface of the unified part as described elsewhere herein. This operation is not shown in FIG. 3.

Figure 4:
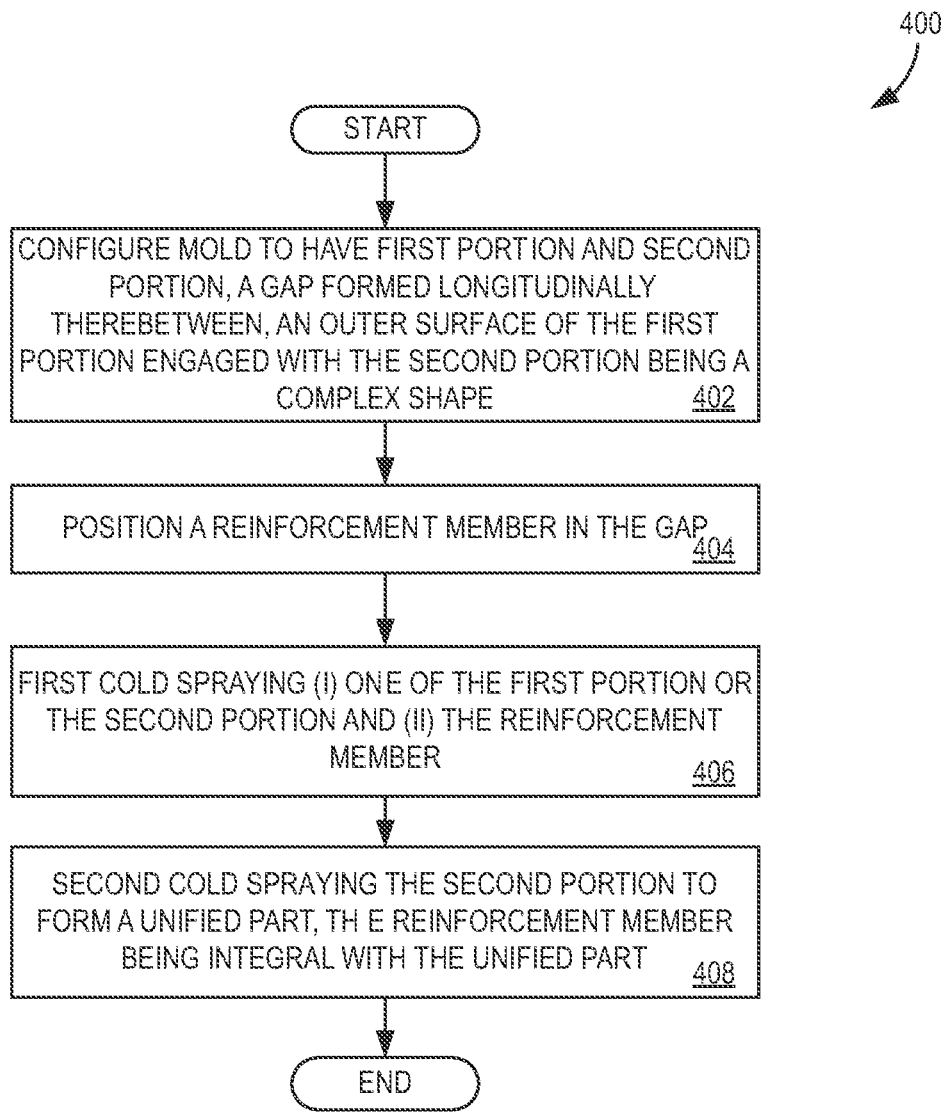
FIG. 4 is a flow chart illustrating a method for cold spray additive manufacturing using a mold in accordance with an implementation.

FIG. 4 is a flow chart illustrating a method 400 for cold spray additive manufacturing using a mold (e.g., the mold 100 of FIGS. 1A-1F) in accordance with an implementation. In some implementations, the process shown in FIG. 4 is performed by, at least in part, a mold having a first portion with an outer surface, a second portion, a gap, and a reinforcement member, such as the mold 100, the first portion 102 with the outer surface 108, the second portion 104, the gap 106, and the reinforcement member 112 in FIGS. 1A-1F. In some implementations, the method 400 forms a unified part, such as the unified part 150 of FIG. 1G.

The method 400 configures a mold to have a first portion and a second portion, with a gap formed longitudinally between the first portion and the second portion at operation 402. In some implementations, the mold comprises an outer surface having multiple different curvatures. By the completion of operation 402, an outer surface of the first portion is engaged with the second portion, comprising a complex shape. A reinforcement member is positioned in the gap at operation 404. In some implementations, the reinforcement member is a planar stiffener.

First cold spraying (i) one of the first portion or the second portion and (ii) the reinforcement member occurs at operation 406. Second cold spraying the second portion to form a unified part occurs at operation 408. The reinforcement member is integral with the unified part. In some implementations, the first cold spraying and the second cold spraying result in at least one surface on the unified part having variable thickness as defined elsewhere in this disclosure.

Thereafter, the process is complete. While the operations illustrated in FIG. 4 are performed by, at least in part, a mold having a first portion with an outer surface, a second portion, a gap, and a reinforcement member, aspects of the disclosure contemplate performance of the operations by other entities. In some implementations, a cloud service performs one or more of the operations (e.g., by conducting the first cold spraying and the second cold spraying).

Figure 5:
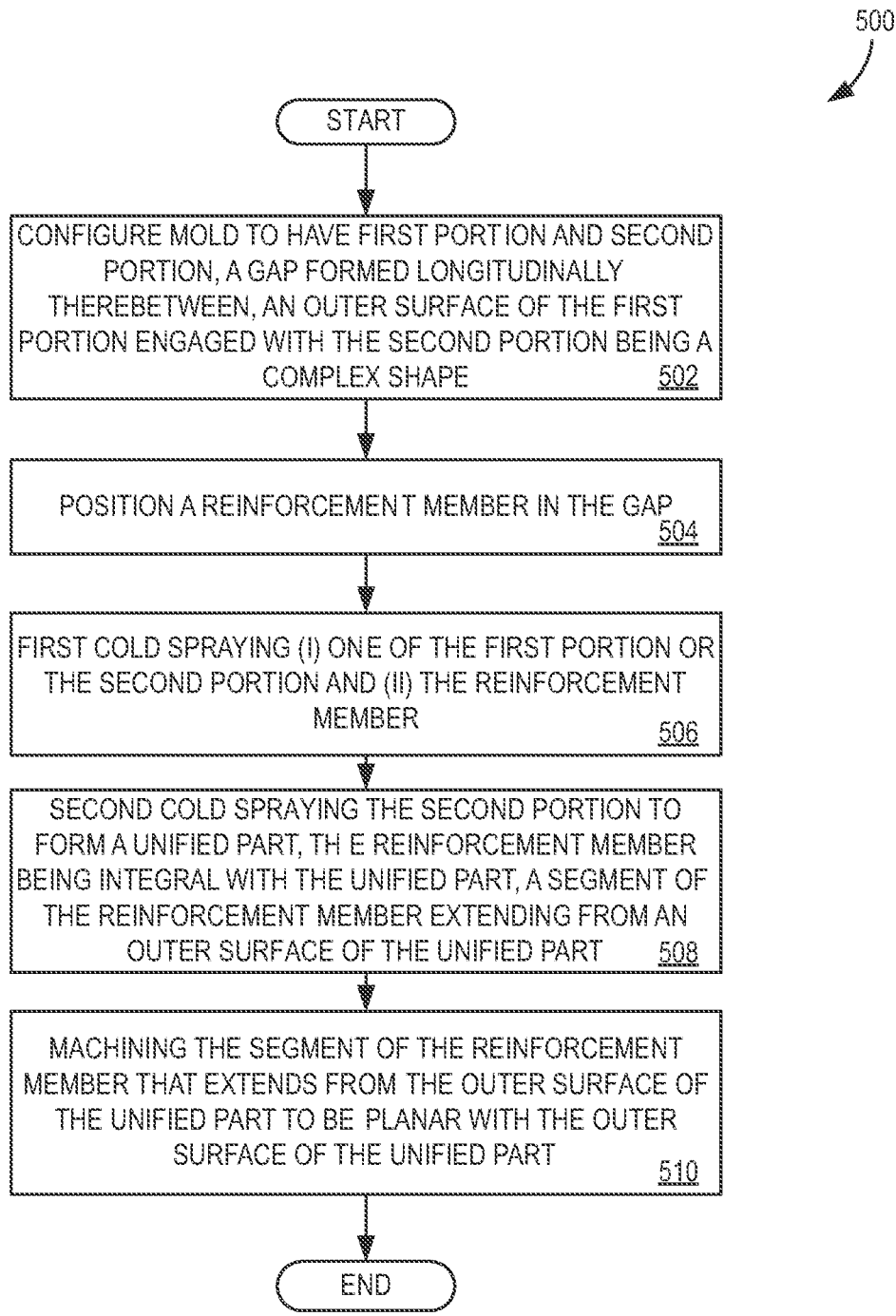
FIG. 5 is a flow chart illustrating a method for cold spray additive manufacturing using a mold and further comprising post-cold spray machining in accordance with an implementation.

FIG. 5 is a flow chart illustrating a method 500 for cold spray additive manufacturing using a mold and further comprising post-cold spray machining in accordance with an implementation. In some implementations, the process shown in FIG. 5 is performed by, at least in part, a mold having a first portion with an outer surface, a second portion, a gap, and a reinforcement member, such as the mold 100, the first portion 102 with the outer surface 108, the second portion 104, the gap 106, and the reinforcement member 112 in FIGS. 1A-1F. In some implementations, the method 500 forms a unified part, such as the unified part 150 of FIG. 1G.

Operations 502, 504, 506, and 508 are similar to operations 402, 404, 406, and 408 of the method 400 depicted in FIG. 4, and accordingly the description will not be repeated. In some implementations, a segment (e.g., the segment 124 of FIGS. 1A-1G) of the reinforcement member extends from an outer surface of the unified part. In such implementations, the method 500 further comprises machining the segment of the reinforcement member that extends from the outer surface of the unified part to be planar with the outer surface of the unified part at operation 510.

Such implementations enable the routine use of any reinforcement member having a standardized shape and size in combination with any mold having any combination of shape and size, without first having to modify the reinforcement member to fit the exact shape and size of the mold before cold spraying. Because the excess non-planar portion of the segment is removed after cold spraying is complete, CSAM as disclosed herein is rendered mechanically simpler, faster, cheaper, and less error prone.

Thereafter, the process is complete. While the operations illustrated in FIG. 5 are performed by, at least in part, a mold having a first portion with an outer surface, a second portion, a gap, and a reinforcement member, aspects of the disclosure contemplate performance of the operations by other entities. In some implementations, a cloud service performs one or more of the operations (e.g., by conducting the first cold spraying and the second cold spraying).

Figure 6:
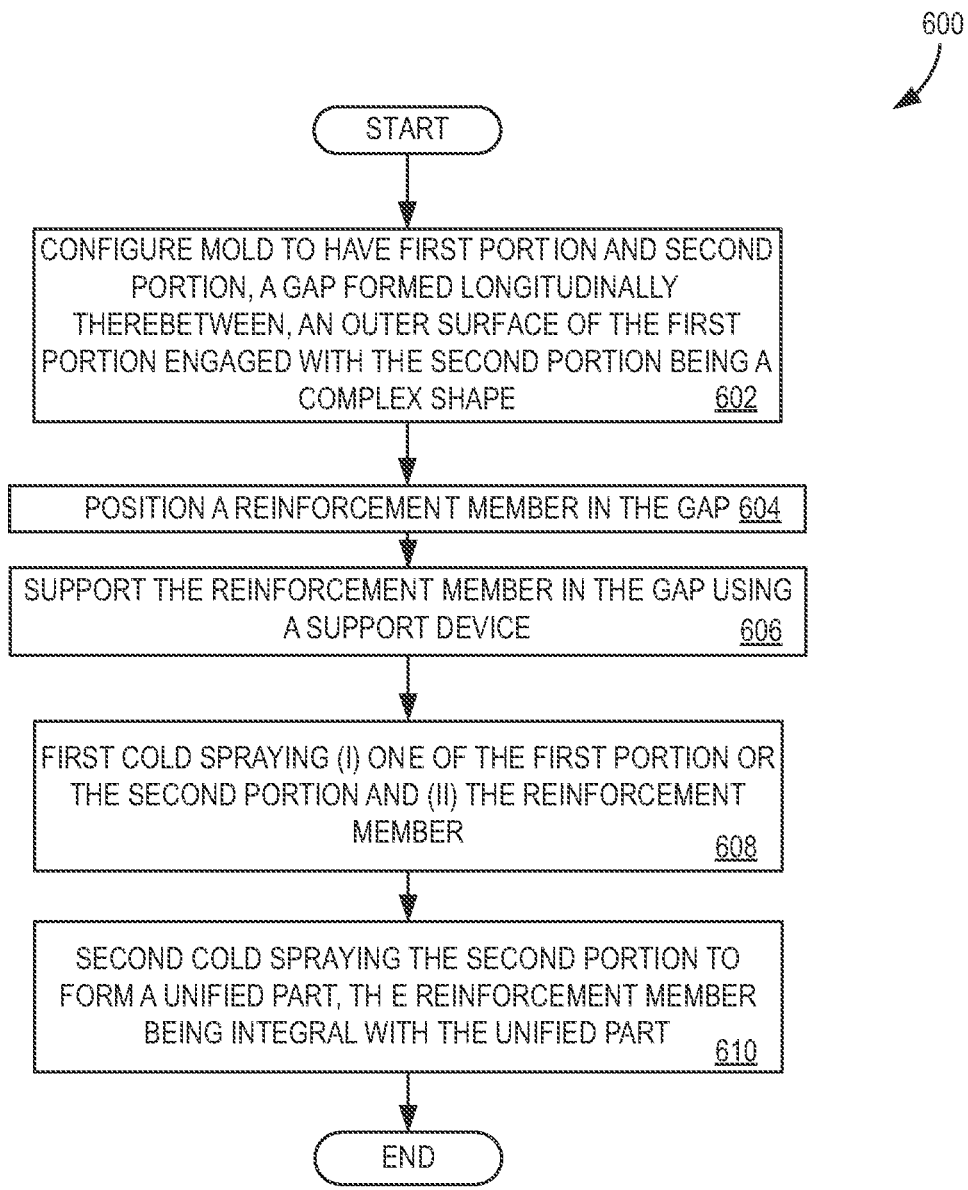
FIG. 6 is a flow chart illustrating a method for cold spray additive manufacturing using a mold and a support device in accordance with an implementation.

FIG. 6 is a flow chart illustrating a method 600 for cold spray additive manufacturing using a mold and a support device in accordance with an implementation. In some implementations, the process shown in FIG. 6 is performed by, at least in part, a mold having a first portion with an outer surface, a second portion, a gap, and a reinforcement member, such as the mold 100, the first portion 102 with the outer surface 108, the second portion 104, the gap 106, and the reinforcement member 112 in FIGS. 1A-1F. In some implementations, the method 600 forms a unified part, such as the unified part 150 of FIG. 1G.

Operations 602 and 604 are similar to operations 402 and 404 of the method 400 depicted in FIG. 4, and accordingly the description will not be repeated. The reinforcement member is supported in the gap using a support device (e.g., the support device 126 of FIGS. 1A-1F) at operation 606. In some implementations, the support device is the support device 126 herein. In some implementations, the support device comprises at least one of one of a fastener, vacuum suction, or magnetic coupling. Operations 608 and 610 are similar to operations 406 and 408 of the method 400 depicted in FIG. 4, and accordingly the description will not be repeated.

Thereafter, the process is complete. While the operations illustrated in FIG. 6 are performed by, at least in part, a mold having a first portion with an outer surface, a second portion, a gap, and a reinforcement member, aspects of the disclosure contemplate performance of the operations by other entities. In some implementations, a cloud service performs one or more of the operations (e.g., by conducting the first cold spraying and the second cold spraying).

Figure 7:
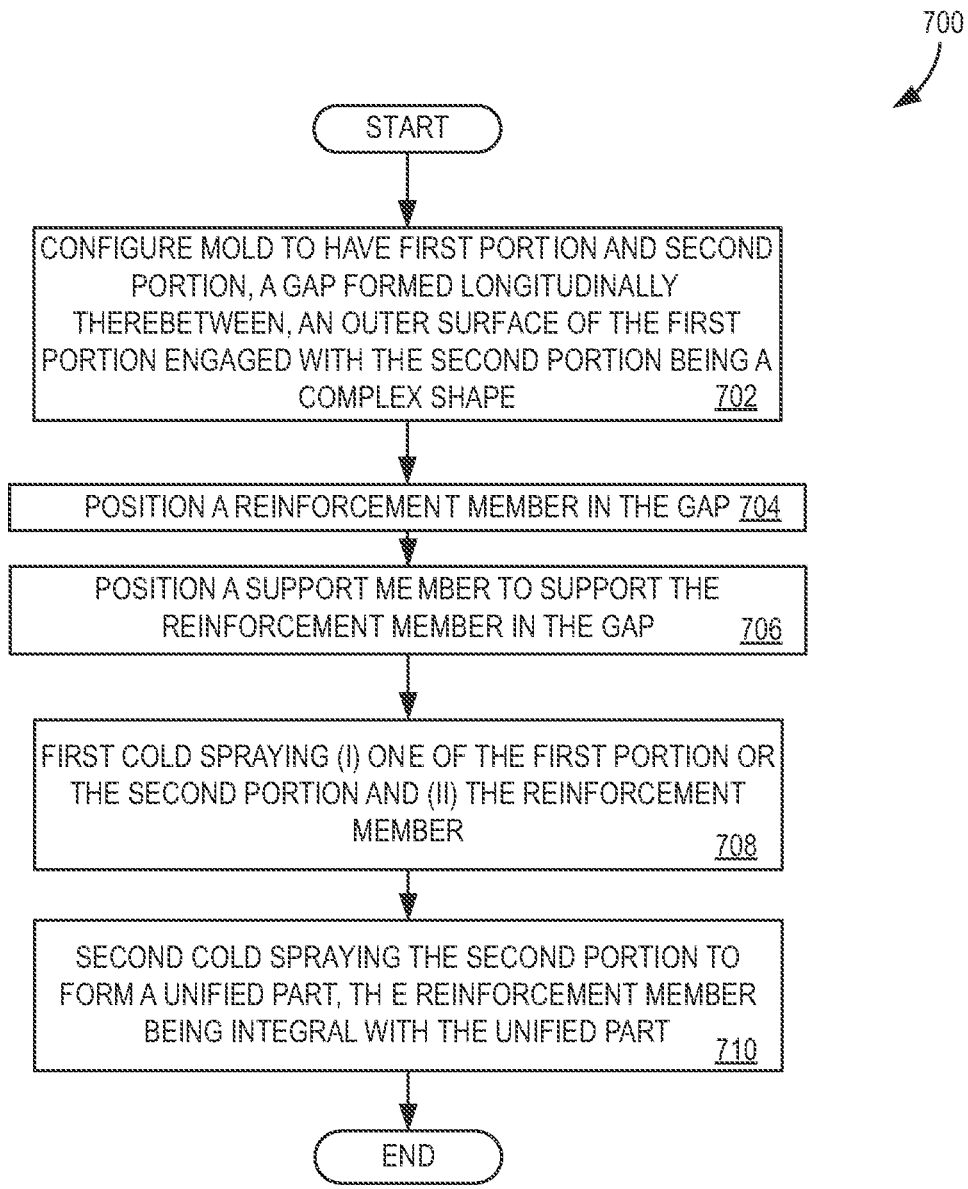
FIG. 7 is a flow chart illustrating a method for cold spray additive manufacturing using a mold and a support member in accordance with an implementation.

FIG. 7 is a flow chart illustrating a method 700 for cold spray additive manufacturing using a mold and a support member in accordance with an implementation. In some implementations, the process shown in FIG. 7 is performed by, at least in part, a mold having a first portion with an outer surface, a second portion, a gap, and a reinforcement member, such as the mold 100, the first portion 102 with the outer surface 108, the second portion 104, the gap 106, and the reinforcement member 112 in FIGS. 1A-1F. In some implementations, the method 600 forms a unified part, such as the unified part 150 of FIG. 1G.

Operations 702 and 704 are similar to operations 402 and 404 of the method 400 depicted in FIG. 4, and accordingly the description will not be repeated. A support member (e.g., the support member 128 of FIGS. 1A-1F) is positioned to support the reinforcement member in the gap at operation 706. In some implementations, the support member is the support member 128 herein. In some implementations, the support member comprises at least one of one of a fastener, vacuum suction, or magnetic coupling. Operations 708 and 710 are similar to operations 406 and 408 of the method 400 depicted in FIG. 4, and accordingly the description will not be repeated.

Thereafter, the process is complete. While the operations illustrated in FIG. 7 are performed by, at least in part, a mold having a first portion with an outer surface, a second portion, a gap, and a reinforcement member, aspects of the disclosure contemplate performance of the operations by other entities. In some implementations, a cloud service performs one or more of the operations (e.g., by conducting the first cold spraying and the second cold spraying).

In some implementations, a unified part (e.g., the unified part 150 of FIG. 1G) is a unified part prepared by a process. The process comprises configuring a mold to have a first portion and a second portion (e.g., operation 402 of FIG. 4). By the conclusion of operation 402, a gap is formed longitudinally between the first portion and the second portion, and an outer surface of the first portion engages with the second portion is a complex shape. The process further comprises positioning a reinforcement member in the gap (e.g., operation 404 of FIG. 4); first cold spraying (i) one of the first portion or the second portion and (ii) the reinforcement member (e.g., operation 406 of FIG. 4); and second cold spraying the second portion to form the unified part (e.g., operation 408). The reinforcement member is integral with the unified part. In some implementations, the first cold spraying and the second cold spraying result in at least one surface on the unified part having variable thickness.

Figure 8:
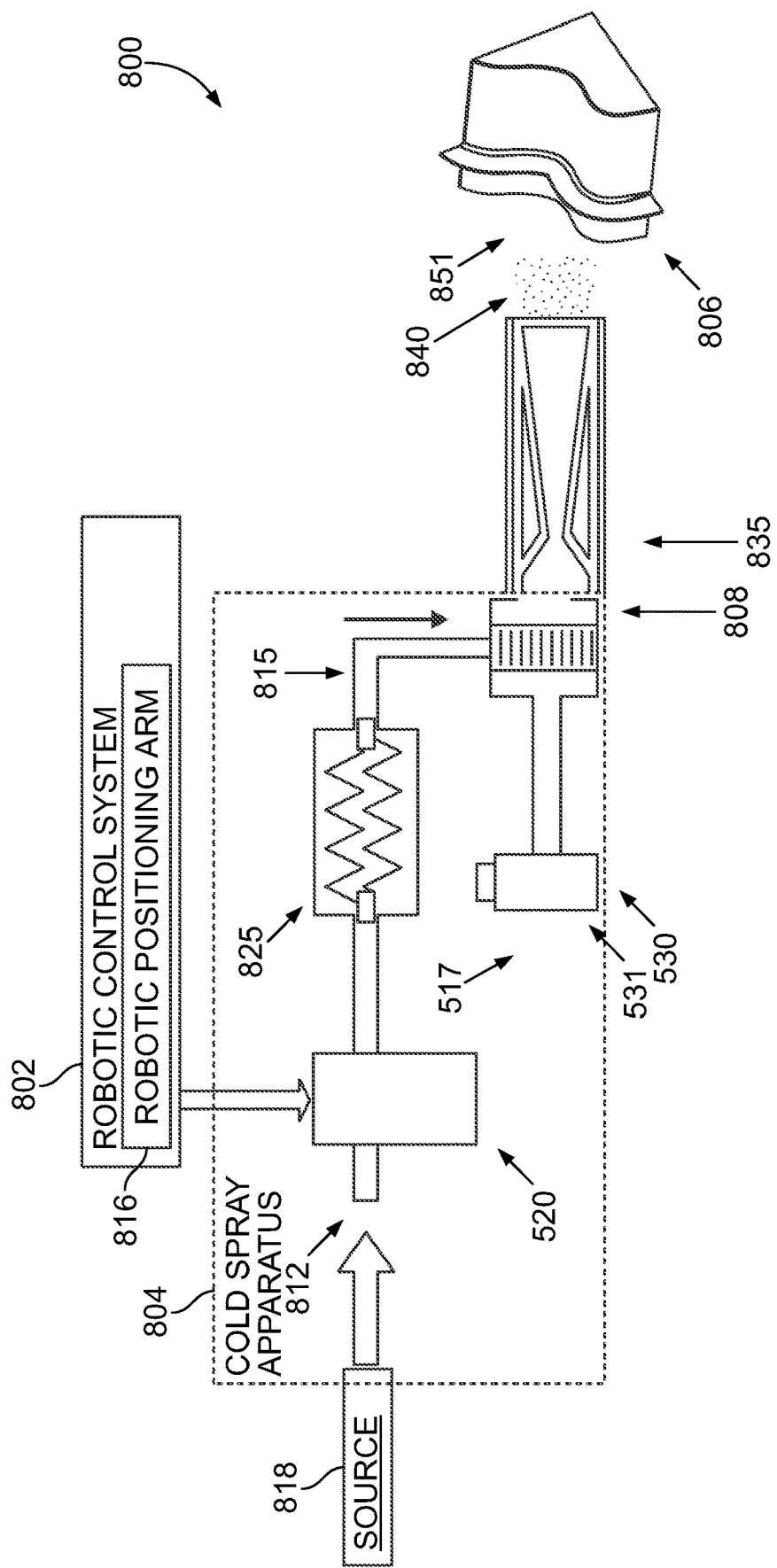
FIG. 8 is a block diagram illustrating an operating environment showing an implementation of a system for performing cold spray additive manufacturing using a mold in accordance with an implementation.

An operating environment is illustrated in FIG. 8 showing a block diagram of an implementation of a system 800 for performing cold spray additive manufacturing using a mold in accordance with an implementation. The system 800 comprises a robotic control system 802 configured to control a cold spray apparatus 804. In some implementations, the robotic control system further comprises a robotic positioning arm 816 (e.g., robotically controlled mechanical arm). In some implementations, the robotic control system 802 is a manual or at least partially automated apparatus. In some such implementations, the robotic control system is controllable using a computing device, such as the computing device 1100 of FIG. 11 herein. In some implementations, the robotic positioning arm 816 is at least a five-axis positioning system that includes two axes for positioning in a plane of the part under repair, one axis for the standout distance, and two additional axes for additional requisite positioning. Alternatively, the robotic positioning arm 816 is at least a two axis positioning system for XY positioning in the plane of part under repair and a rolling system that maintains parallelism and standout distance with the substrate of the part under repair. The robotic positioning arm 816, in some implementations, is an ADEPT® Viper robot from Omron Adept Technologies, Inc.

The cold spray apparatus 804 of the system 800 further comprises a supersonic nozzle 835 and is configured to perform cold spray additive manufacturing of a part 806. In some implementations, the cold spray apparatus 804 is further configured to cold spray a powder 830 onto a substrate 851 of the part 806. In such implementations, the cold spray apparatus 804 further comprises a source 818 of gas 812 connected to a gas control module 820. The gas control module 820 controls the flow of the gas 812 through a first line 815 connected to the supersonic nozzle 835 and through a second line 820 connected to a powder chamber 831 and then to the supersonic nozzle 835. The cold spray apparatus 804 additionally comprises a heater 825 that heats the gas 812 to a requisite temperature prior to entrance of the gas 812 into the supersonic nozzle 835. In some implementations, the substrate 851 is also heated to further facilitate mechanical bonding.

In operation, the gas 812 flows through the first line 815 and the second line 820 causing the powder 830 located within the powder chamber 831 to be sprayed in a supersonic gas jet from the supersonic nozzle 835 as a particle stream 840. The particle stream 840 is sprayed at a temperature below the melting point of the powder 830 and travels at a supersonic velocity from the supersonic nozzle 835. In some implementations, the particle stream 840 travels at several times the speed of sound. (The exact speed of sound at a given time varies depending on local conditions.) In some implementations, the particle stream 840 travels at least two- to four-times the speed of sound. The particle stream is deposited on the substrate 851 of the part 806, whereby on impact on the substrate 851, particles of the particle stream 840 undergo plastic deformation due to the supersonic velocity of the particle stream 840 and bond to each other and the substrate 851 of the part 806 using mechanical energy. The heater 825 accelerates the speed of the particle stream 840, but the heat from the heated gas 812 is not transferred to the bonding of the particles of the particle stream 840. Thus, the heat cannot cause deformities, warping, stresses, or other deleterious impacts to the bonding. In some implementations, once the cold spray process is complete the substrate 851 is further processes, such as polished to create or restore a smooth finish.

Additional Examples

Some implementations of the disclosure provide a CSAM process to create a unified part with at least one complex curvature that incorporates stiffeners or reinforcement members into the unified part. In some implementations, a computer-controlled robotic arm holds the cold spray apparatus and uses a mathematical model to determine the number of passes required to create the unified part. A deposit of cold sprayed material is built up layer by layer as the supersonic nozzle moves over a mold repeatedly. The number of passes and speed of the passes determine the thickness of the unified part.

In such implementations, at least one reinforcement member or stiffener is inserted into the mold. As the robotic arm sprays over the at least one reinforcement member or stiffener, the at least one reinforcement member or stiffener is integrated into the unified part. Once the CSAM process is complete, the unified part is removed from the mold to produce a near net shape unified part. The at least one reinforcement member or stiffener is integrated into the unified part with and by the deposited cold sprayed material. Such implementations are able to produce unified parts each having at least one complex radius of curvature. Some such unified parts include but are not limited to tail cones for airplanes; or nose cones and fins for missiles.

The implementations herein provide apparatuses, methods, and products for CSAM of CMCPs. Some implementations of the CSAM of CMCPs disclosed herein incorporate a support device (e.g., the support device 126) to configured to support a reinforcement member (e.g., the reinforcement member 112) in a gap (e.g., the gap 106). The disclosure herein operates at the point of CMCP manufacture to produce a unified part with multiple radii of curvature having a complex shape and an integral reinforcement member or stiffener by a CSAM process. The disclosure also controls surface thickness in different locations of the fabricated CMCP, allowing for variable surface thicknesses across the CMCP. The disclosure further adds stiffness to the CMCP as required without unnecessarily increasing weight in the CMCP.

Use of a mold comprising reinforcement during CSAM-based fabrication of CMCPs allows for greater flexibility in fabrication and a mechanically superior fabricated CMCP in comparison to traditional contemporary techniques. Some such traditional contemporary techniques ("traditional spray techniques") spray a reinforcement material directly unto a part to create a CMCP. Some of these traditional spray techniques offer a limited amount of reinforcement, as, e.g., no reinforcement member is present to provide the mechanical benefits of a stiffener working in combination with a mold. Some such traditional spray techniques, when used with a robotic arm-based CSAM apparatus, also require an extra arm (e.g., one arm for spraying cold spray feedstock, and another for spraying the reinforcement material), making CMCP fabrication both more mechanically complex and more expensive and error prone. Some traditional cold spray techniques require multiple spray passes to build reinforcements and result in a finished CMCP having inferior surface conditions and requiring more corrective machining compared to the disclosed unified part. In particular, spraying the reinforcement material results in an accumulation of excess reinforcement material that must be removed via machining before the CMCP meets specifications and is ready for actual use. This additional machining tends to unavoidably reduce the quality and effectiveness of the reinforcement material.

The disclosure does not require reinforcement material to be sprayed at all. The disclosure is thus less wasteful, and less machining is required to render the disclosed fabricated CMCP compliant with specifications and ready for actual use. The disclosed molds, methods, and products are thus mechanically simpler, cheaper, and less error prone than traditional spray techniques. Further, the use of a distinct internal reinforcement member or stiffener provides mechanically superior reinforcement compared to the sprayed-on, external reinforcement of traditional spray techniques. Factoring reinforcement out of the spraying process also allows the disclosure to provide superior control over surface thickness of the unified part (including providing for variable surface thickness as defined herein) compared to traditional spray techniques.

Unless otherwise stated, any implementation described herein as being incorporated into or being used in combination with a specific type of vehicle (e.g., an aircraft or helicopter) shall be understood to be installable into and usable with any other type of vehicle (e.g., trains, submersibles, tanks, armored personnel carriers, watercraft, etc.). Implementations of the disclosure herein are well-suited to manufacturing replacement parts for aircraft as described elsewhere herein, allowing the service life of such aircraft to be maximally extended at lesser cost. Cold spray is recognized by various organizations as a solution distinct from and advantageous over thermal spray.

In particular, as aircraft enter the extreme ends of repeatedly extended service lifetimes, inevitably fleet fatigue causes cracks and other damage requiring structural repairs, part replacement, and part repair to keep the aircraft in service. This escalates the cost of keeping such aircraft flying due to requiring recurrent inspections to maintain air worthiness, eventual retrofits, and long lead times and high expenses associated with supply chain issues. Cold spray is especially well suited to create replacement parts to rehabilitate such aircraft, potentially significantly reducing maintenance costs and also lowing downtime for military aircraft platforms. In 2008 (with revisions following in 2011 and 2015), the United States Department of Defense adopted and promulgated MIL Spec MIL-STD-3021 ("DOD Manufacturing Process Standard, Materials Deposition, Cold Spray"). The MIL-STD-3021 standard has been adopted by various other organizations around the world.

The disclosure herein is usable in a number of present military and commercial cold spray applications. Such applications include, but are not limited to, fabrication and replacement of magnesium aerospace components, fabrication and replacement of landing gear hydraulics, and fabrication and replacement of non-aerospace components, among others.

Compared to traditional, contemporary cold spray techniques, the disclosure enables fabrication of more complex parts with multiple radii of curvature and multiple integrated internal reinforcements. The disclosure is applicable to a wide variety of components across many fields of endeavor. In particular, the disclosure is heavily applicable to parts fabrication in automotive and aeronautical spaces, which require the fabrication of reinforced CMCPs. In some implementations, complex structures otherwise requiring fabrication and assembly of multiple parts are instead able to be fabricated as a single integrated CMCP as disclosed herein. Such consolidation significantly reduces cost and simplifies supplier chains. In some implementations, the fabricated unified part is a permanently integrated single structure and not an collection of subparts able to be disassembled.

At least a portion of the functionality of the various elements in the figures are in some implementations performed by other elements in the figures, and or an entity (e.g., a computer) not shown in the figures.

In some implementations, the operations illustrated in FIGS. 4-7 are performed by a single person, a group of persons, a fully- or partially-automated CSAM system, or any combination of the foregoing. As an illustration, in some implementations the mold 100 and the reinforcement member 112 of FIG. 1 are each be provided by distinct suppliers to a wholly separate assembler who couples the mold 100 to the reinforcement member 112.

While the aspects of the disclosure have been described in terms of various implementations with their associated operations, a person skilled in the art would appreciate that a combination of operations from any number of different implementations is also within scope of the aspects of the disclosure.

Exemplary Operating Environment

Figure 9:
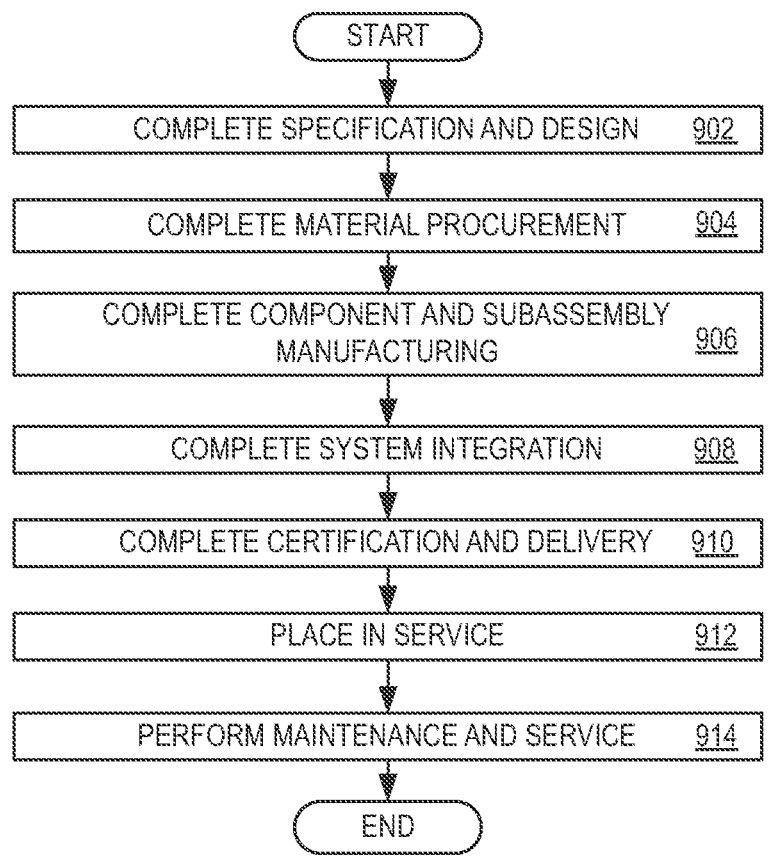
FIG. 9 is a flow chart illustrating a method for aircraft manufacturing and service in accordance with an implementation.

The present disclosure is operable within an aircraft manufacturing and service method according to an implementation as a method 900 in FIG. 9. During pre-production of the aircraft, some implementations of method 900 include specification and design of the aircraft at operation 902, and material procurement at operation 904. During production, some implementations of method 900 include component and subassembly manufacturing at operation 906 and aircraft system integration at operation 908. The aircraft undergoes certification and delivery at operation 910 in order to be placed in service at operation 912. While in service of a customer, the aircraft is scheduled for routine maintenance and service at operation 914. In some implementations, operation 914 comprises modification, reconfiguration, refurbishment, and other operations associated with maintaining the aircraft in acceptable, safe condition during ongoing flight operations. Systems and methods for cold spray additive manufacturing as disclosed herein are used during operation 914.

Each of the processes of method 900 are performable or practicable by a system integrator, a third party, or an operator (e.g., a customer). For the purposes of this disclosure, a system integrator comprises any number of aircraft manufacturers and major-system subcontractors; a third party comprises any number of vendors, subcontractors, and suppliers; and an operator comprises an airline, leasing company, military entity, service organization, and similar entities providing similar sales and leasing services.

Figure 10:
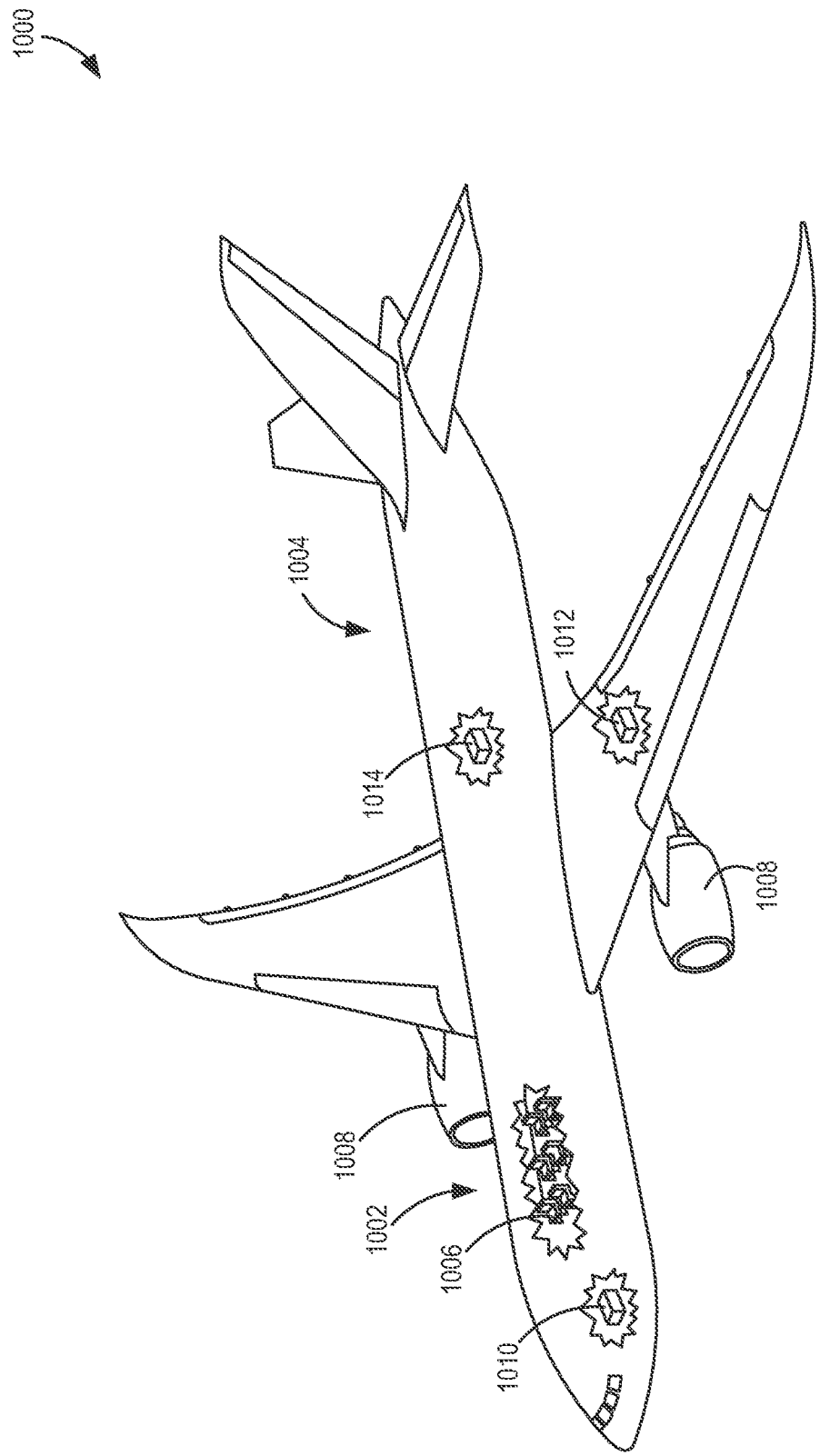
FIG. 10 is a schematic perspective view of an aircraft in accordance with an implementation.

The present disclosure is operable in a variety of terrestrial and extra-terrestrial environments for a variety of applications. For illustrative purposes only, and with no intent to limit the possible operating environments in which implementations of the disclosure operate, the following exemplary operating environment is presented. The present disclosure is operable within an aircraft operating environment according to an implementation as an aircraft 1000 in FIG. 10. Implementations of the aircraft 1000 include but are not limited to an airframe 1002, a plurality of high-level systems 1004, and an interior 1006. Some implementations of the aircraft 1000 incorporate high-level systems 1004 including but not limited to: one or more of a propulsion system 1008, an electrical system 1010, a hydraulic system 1012, and an environmental system 1014. Any number of other systems may be included in implementations of the aircraft 1000. Although an aerospace implementation is shown, the principles are applicable to other industries, such as the automotive and nautical industries.

Figure 11:
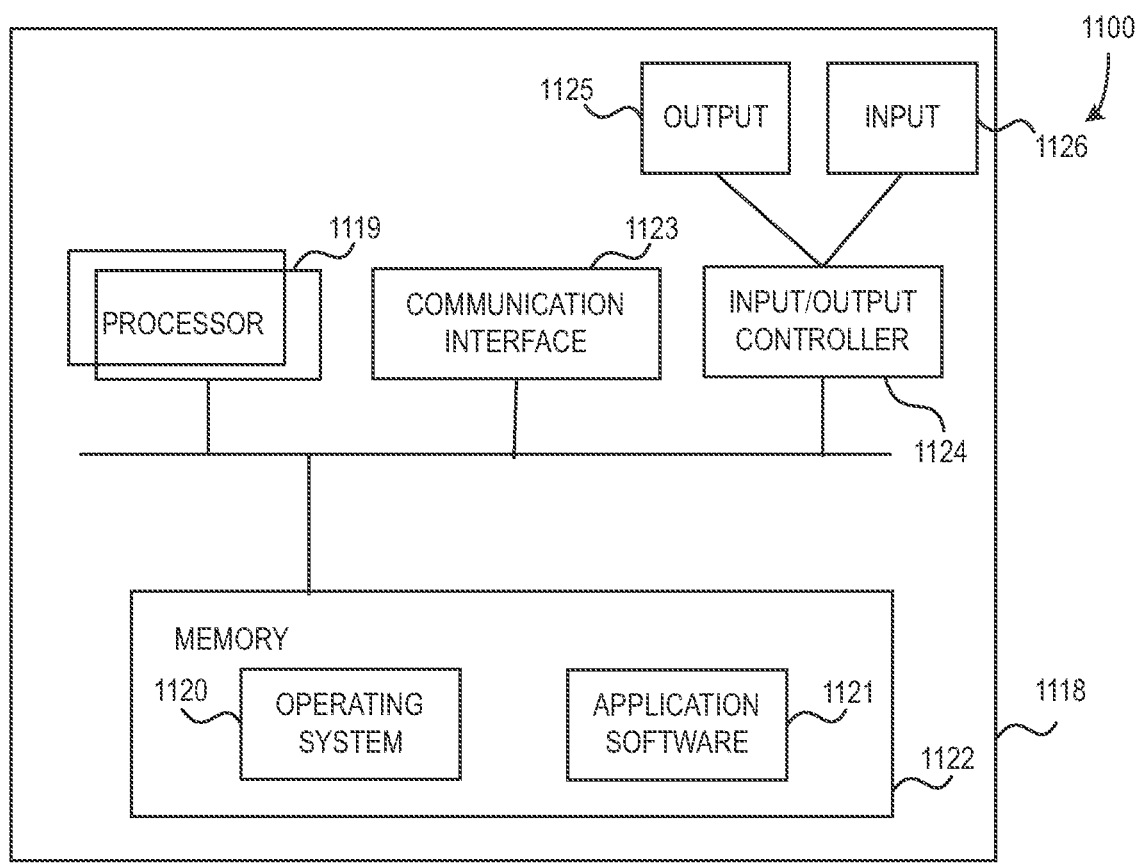
FIG. 11 is a functional block diagram illustrating a computing apparatus in accordance with an implementation.

The present disclosure is operable with a computing apparatus according to an implementation as a functional block diagram 1100 in FIG. 11. In such an implementation, components of a computing apparatus 1118 may be implemented as a part of an electronic device according to one or more implementations described in this specification. The computing apparatus 1118 comprises one or more processors 1119 which may be microprocessors, controllers or any other suitable type of processors for processing computer executable instructions to control the operation of the electronic device. Platform software comprising an operating system 1120 or any other suitable platform software may be provided on the apparatus 1118 to enable application software 1121 to be executed on the device. According to an implementation, the method for performing cold spray additive manufacturing as described herein is implemented at least partially by software. According to another implementation, the system 800 for performing cold spray additive manufacturing using a mold as described herein is implemented at least partially by software.

Computer executable instructions may be provided using any computer-readable media that are accessible by the computing apparatus 1118. Computer-readable media may include, without limitation, computer storage media such as a memory 1122 and communications media. Computer storage media, such as a memory 1122, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1122) is shown within the computing apparatus 1118, it will be appreciated by a person skilled in the art, that the storage may be distributed or located remotely and accessed via a network or other communication link (e.g., using a communication interface 1123).

The computing apparatus 1118 may comprise an input/output controller 1124 configured to output information to one or more output devices 1125, in some implementations a display or a speaker, which may be separate from or integral to the electronic device. The input/output controller 1124 may also be configured to receive and process an input from one or more input devices 1126, in some implementations a keyboard, a microphone or a touchpad. In one implementation, the output device 1125 may also act as the input device. A touch sensitive display is one such device. The input/output controller 1124 may also output data to devices other than the output device, e.g., a locally connected printing device. In some implementations, a user may provide input to the input device(s) 1126 and/or receive output from the output device(s) 1125.

The functionality described herein is performable, at least in part, by one or more hardware logic components. According to an implementation, the computing apparatus 1118 is configured by the program code when executed by the processor 1119 to execute the implementations of the operations and functionality described. Alternatively, or in addition, the functionality described herein is performable, at least in part, by one or more hardware logic components. Without limitation, illustrative types of hardware logic components that are usable include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Thus, various implementations include apparatuses, methods, and products for performing a method for performing cold spray additive manufacturing comprising: configuring a mold to have a first portion and a second portion, a gap formed longitudinally between the first portion and the second portion, an outer surface of the first portion engaged with the second portion being a complex shape; positioning a reinforcement member in the gap; first cold spraying (i) one of the first portion or the second portion and (ii) the reinforcement member; and second cold spraying the second portion to form a unified part, the reinforcement member being integral with the unified part.

As described herein, the present disclosure provides apparatuses, methods, and products for cold spray additive manufacturing of multi curved and reinforced components. The systems and methods herein efficiently and effectively construct and deploy within a CSAM system suitable for use in connection with manufacturing of multi curved and reinforced components for various types of moving vehicles, including but not limited to the above exemplary operating environment.

While various spatial and directional terms, such as top, bottom, lower, mid, lateral, horizontal, vertical, front and the like may be used to describe the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein is extendable or alterable without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above can relate to one implementation or can relate to several implementations. The implementations are not limited to those that address every issue discussed in the Background herein or those that have any or all of the stated benefits and advantages.

The implementations illustrated and described herein as well as implementations not specifically described herein but within the scope of aspects of the claims constitute exemplary means for cold spray additive manufacturing with gas recovery.

The order of execution or performance of the operations in implementations of the disclosure illustrated and described herein is not essential, unless otherwise specified. That is, the operations may be performed in any order, unless otherwise specified, and examples of the disclosure may include additional or fewer operations than those disclosed herein. As an illustration, it is contemplated that executing or performing a particular operation before, contemporaneously with, or after another operation is within the scope of aspects of the disclosure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Clauses

The following clauses describe further aspects:
Clause Set A:
A1. A mold for cold spray additive manufacturing, the mold comprising:
 a first portion;
 a second portion, the first portion and the second portion configured to abuttingly engage each other with a gap formed longitudinally therebetween, an outer surface of the first portion engaged with the second portion being a complex shape; and
 a reinforcement member positioned in the gap, wherein the first portion, the second portion, and the reinforcement member are configured to be cold sprayed to form a unified part including the reinforcement member being integral therewith.
A2. The mold of any preceding clause, wherein the gap is formed by a cutout in one of the first portion or the second portion.
A3. The mold of any preceding clause, wherein the cutout extends only along a subsection of one side of the first portion or the second portion to form a ridge extending longitudinally along the subsection.
A4. The mold of any preceding clause, wherein the complex shape comprises multiple different curvatures.
A5. The mold of any preceding clause, wherein the reinforcement member is a planar stiffener.
A6. The mold of any preceding clause, the unified part formed by the cold spraying further comprising an at least one surface having variable thickness.
A7. The mold of any preceding clause, wherein
 a segment of the reinforcement member extends from an outer surface of the unified part; and
 the segment being machined to be planar with the outer surface of the unified part.
A8. The mold of any preceding clause, further comprising a support device configured to support the reinforcement member in the gap.
A9. The mold of any preceding clause, wherein the support device comprises at least one of a fastener, vacuum suction, or magnetic coupling.
A10. The mod of any preceding clause, further comprising a support member positioned to support the reinforcement member in the gap.
Clause Set B:
B1. A method for performing cold spray additive manufacturing, the method comprising:
 configuring a mold to have a first portion and a second portion, a gap formed longitudinally between the first portion and the second portion, an outer surface of the first portion engaged with the second portion being a complex shape;
 positioning a reinforcement member in the gap;
 first cold spraying (i) one of the first portion or the second portion and
 (ii) the reinforcement member; and
 second cold spraying the second portion to form a unified part, the reinforcement member being integral with the unified part.
B2. The method of any preceding clause, wherein the mold comprises an outer surface having multiple different curvatures.
B3. The method of any preceding clause, wherein the reinforcement member is a planar stiffener.
B4. The method of any preceding clause, wherein the first cold spraying and the second cold spraying result in at least one surface on the unified part having variable thickness.
B5. The method of any preceding clause, wherein a segment of the reinforcement member extends from an outer surface of the unified part, and further comprising machining the segment of the reinforcement member that extends from the outer surface of the unified part to be planar with the outer surface of the unified part.
B6. The method of any preceding clause, further comprising supporting the reinforcement member in the gap using a support device.
B7. The method of any preceding clause, wherein the support device comprises at least one of one of a fastener, vacuum suction, or magnetic coupling.
B8. The method of any preceding clause, further comprising positioning a support member to support the reinforcement member in the gap.
Clause Set C:
C1. A unified part prepared by a cold spray additive manufacturing process comprising the steps of
 configuring a mold to have a first portion and a second portion, a gap formed longitudinally between the first portion and the second portion, an outer surface of the first portion engaged with the second portion being a complex shape;
 positioning a reinforcement member in the gap;
 first cold spraying (i) one of the first portion or the second portion and (ii) the reinforcement member; and
 second cold spraying the second portion to form the unified part, the reinforcement member being integral with the unified part.
C2. The unified part of any preceding clause, wherein the first cold spraying and the second cold spraying result in at least one surface on the unified part having variable thickness.

What is claimed is:

1. A mold for cold spray additive manufacturing, the mold comprising:
 a first portion;
 a second portion, the first portion and the second portion abuttingly engaged with each other along a first subsection of an inner surface of both the first portion and the second portion with a gap formed longitudinally between a second subsection of the inner surface of the second portion and the first portion, an outer surface of both the first portion and the second portion having a reinforced shape with multiple curves;

a reinforcement member having a first segment of a reinforcement surface positioned in the gap and a second segment of the reinforcement surface extending out of the gap and extending from the outer surface of the first portion as well as from the outer surface of the second portion, wherein the outer surface of the first portion, the outer surface of the second portion, and the reinforcement member form a unified part when cold sprayed, wherein the unified part includes including the reinforcement member being integral therewith and excludes the first portion and second portion, and wherein the first portion and second portion are disengageable from the reinforcement member when the unified part including the reinforcement member has been formed; and a surface coating applied to the outer surface of both the first portion and the second portion to facilitate non-destructive separation from material cold sprayed onto the first portion and the second portion.

2. The mold of claim 1, wherein the gap is formed by a cutout in one of the first portion or the second portion.

3. The mold of claim 2, wherein the cutout extends only along the second subsection of one side of the first portion to form a ridge extending longitudinally along the second subsection.

4. The mold of claim 1, wherein the reinforced shape with multiple curves comprises multiple different curvatures.

5. The mold of claim 1, wherein the reinforcement member is one of a planar stiffener or a curved stiffener.

6. The mold of claim 1, wherein the reinforced shape with multiple curves comprises at least two surfaces having different radii of curvature.

7. The mold of claim 1, the unified part formed by the cold spraying further comprising an at least one surface having variable thickness.

8. The mold of claim 1, wherein the reinforced shape with multiple curves comprises a segment configured to extend from an outer surface of the unified part; and the segment being machined to be planar with the outer surface of the unified part.

9. The mold of claim 1, further comprising a support device configured to support the reinforcement member in the gap.

10. The mold of claim 9, wherein the support device comprises at least one of a fastener, vacuum suction, or magnetic coupling.

11. The mold of claim 1, further comprising a support member positioned to support the reinforcement member in the gap.

12. A method for performing cold spray additive manufacturing, the method comprising:

providing the mold of claim 1;

first cold spraying (i) one of the outer surface of the first portion or the outer surface of the second portion and (ii) the reinforcement member;

second cold spraying the other of the outer surface of the first portion or the outer surface of the second portion to form a unified part excluding the first portion and second portion of the mold, the reinforcement member being integral with the unified part; and disengaging the first portion and second portion from the reinforcement member when the unified part including the reinforcement member has been formed.

13. A mold for use in cold spray additive manufacturing, comprising:

a first mold portion and a second mold portion, each having an inner surface and an outer surface, the first and second mold portions configured such that a first subsection of the inner surface of the first mold portion is directly abutted against a corresponding first subsection of the inner surface of the second mold portion, and a second subsection of the inner surface of the first mold portion and a second subsection of the inner surface of the second mold portion cooperatively define a longitudinal gap between the first mold portion and the second mold portion, wherein the outer surfaces of the first portion and the second portion cooperatively form a multi-curved shape configured to receive deposition of cold spray material;

a reinforcement member positioned within the longitudinal gap defined by the second subsections of the inner surfaces of the first and second mold portions, wherein the reinforcement member is configured to become integrally incorporated into a unified part formed by cold spray additive manufacturing onto the outer surfaces of the first and second mold portions and onto the reinforcement member; and a surface coating applied to the outer surfaces of both the first mold portion and the second mold portion to facilitate non-destructive separation of the unified part formed by cold spray deposition from the outer surfaces of the first mold portion and the second mold portion after manufacturing is complete.

14. The mold of claim 13, wherein the longitudinal gap between the first mold portion and the second mold portion is formed by a cutout extending along at least a subsection of the second subsection of the inner surface of at least one of the first mold portion or the second mold portion.

15. The mold of claim 13, wherein the reinforcement member is a planar stiffener.

16. The mold of claim 13, further comprising a support device positioned within the longitudinal gap and configured to support the reinforcement member during cold spray additive manufacturing.

17. The mold of claim 16, wherein the support device comprises at least one of a fastener, vacuum suction, or magnetic coupling.

18. The mold of claim 13, wherein the outer surfaces of the first mold portion and the second mold portion form a shape comprising multiple surfaces, each having a distinct radius of curvature.

19. The mold of claim 13, wherein the reinforcement member protrudes partially outward from the outer surfaces of the first mold portion and the second mold portion.

20. The mold of claim 19, wherein the protruding portion of the reinforcement member is configured to be machined flush with the outer surfaces of the first mold portion and second mold portion after formation of the unified part is complete.

21. The mold of claim 13, wherein the first mold portion and second mold portion are each composed of at least one material selected from aluminum, steel, stainless steel, titanium, nickel-based alloys, copper-based alloys, zirconium, tantalum, or refractory metals.

22. The mold of claim 13, wherein the surface coating comprises a lanolin-based fluid film forming a non-drying, corrosion-resistant barrier to facilitate non-destructive removal of the unified part after cold spray additive manufacturing is completed.

* * * * *